Aug. 12, 1969 J. L. METZ 3,460,244

METHOD OF MANUFACTURING A MULTI-TRACK MAGNETIC HEAD

Filed Sept. 10, 1965 2 Sheets-Sheet 1

INVENTOR
JACK L. METZ

BY R.C. Perry
ATTORNEY

United States Patent Office 3,460,244

Patented Aug. 12, 1969

3,460,244

METHOD OF MANUFACTURING A MULTI-TRACK MAGNETIC HEAD

Jack L. Metz, Des Plaines, Ill., assignor to Teletype Corporation, Skokie, Ill., a corporation of Delaware Filed Sept. 10, 1965, Ser. No. 486,371

Int. Cl. H01f *7/06;* G11b *5/42*

U.S. Cl. 29—603 10 Claims

ABSTRACT OF THE DISCLOSURE

A method of manufacturing multi-tract read/write heads for magnetic drum recorders or discs wherein a plurality of heads, in aligned integral form, are joined to a plurality of furcations of a furcated sheet of spring material and then the heads are separated from one another while still retaining their aligned relationship.

This invention relates to a method of making a multi-track read/write head for magnetic drum recorders or discs and more particularly to a method of mounting recording heads for use with multi-trace recording drums or discs.

It is an object of the present invention to simplify the manufacture of multi-track read/write heads.

Another object of the invention is the provision of a simple method for making multi-track read/write head assemblages in which the heads are individually spring supported for cooperation with the traces or tracks on a magnetic drum or disc.

In accordance with a preferred form of the invention the pole piece pairs of a plurality of read/write heads are assembled with their respective energizing coils and are inserted between a pair of cooperating housing members, the housing members serving accurately to space the pole piece pairs one from another with the gaps between the pole pieces in exact alignment. When all of the head assemblages comprising the energizing coils and pole piece pairs have been fixed in position between the housing members and thus locked in the desired spaced apart relation with their gaps in exact alignment, this assembly is potted with any suitable potting compound for example, an epoxy resin, to form a unitary multi-track head structure with the pole piece pairs secured in the proper alignment to cooperate with tracks or traces on a magnetic storage member.

After the unitary multi-track head structure is thus formed, portions of the cooperating housing members and portions of the pole piece pairs adjacent the gaps may be ground away to expose the flux concentrating portions of the pairs and the gap. The pole piece pairs having been thus exactly spaced and aligned in the desired ultimate location, the entire unitary head structure is fixed to the extending furcations of a furcated sheet of spring material which has a plurality of slots cut through a substantial portion of its length to form the furcations and which is perforated at the free ends of the furcations with clearance holes through which the exposed ends of the pole piece pairs project.

After the unitary multi-track head structure is fixed to the furcations of the spring, the unitary head structure is cut into separate heads, each supported by a single contact spring member thereby to completely separate each head from every other head while retaining all of the heads with the gaps between the pole pairs in alignment and spaced exactly as they were in the unitary head structure before the head structure was attached to the sheet of spring material.

A more complete understanding of the invention may be had by reference to the accompanying drawings wherein.

Figure 4:
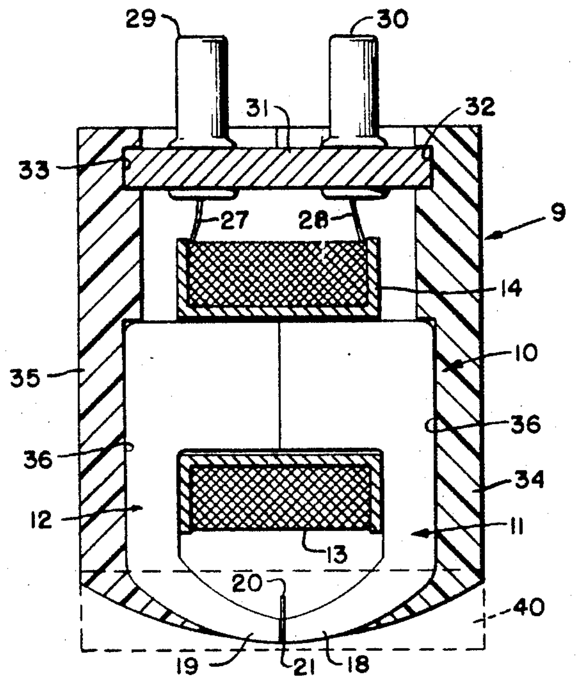
Figure 5:
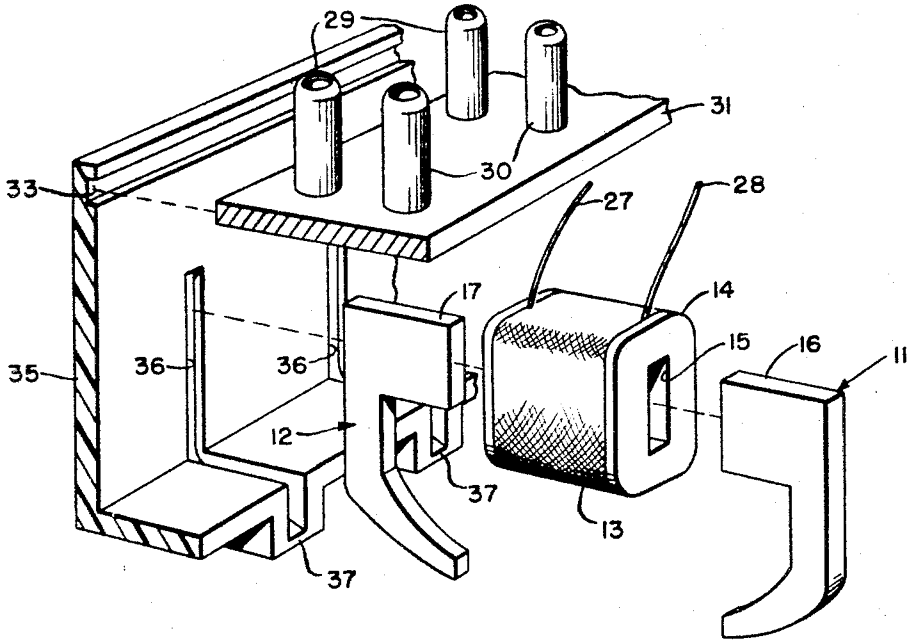

FIG. 4 is a transverse sectional view through one of the read/write heads showing the arrangement of the pole piece pair and its activating coil; and FIG. 5 is an exploded view in perspective showing the pole piece pair activating coil, one housing member (which provides one-half of the complete housing) and a terminal board which is mounted in the housing members to provide terminals for connection to the leads of the activating coil.

Referring now to the drawings wherein like reference characters designate the same parts throughout the several views, it will be seen that each read/write head 9 comprises, as shown most clearly in FIGS. 4 and 5, a pole piece pair 10 which includes pole pieces 11 and 12 and an activating coil 13. The coil 13 is wound upon a bobbin 14 which has a central aperture 15 for the reception of cooperating core pieces 16 and 17 that are arranged to be moved into contact one with the other to form the core of the electromagnet, the activation of which controls the application of magnetic flux to the head 9. The lower portions of the pole pieces 11 and 12 are arcuately shaped and reduced in depth to provide pole shoes 18 and 19 which are spaced apart by a shim 20 to provide a flux gap 21. The coil 13 has lead wires 27 and 28 extending from its opposite ends for attachment to terminals 29 and 30. The terminals 29 and 30 are mounted in a terminal board 31 which in the preliminary stages of manufacture of the multi-track read/write heads is common to a plurality of heads 9.

The terminal board 31 is set into grooves 32 and 33 formed in housing member 34 and 35 which together form a common support for all of the heads 9. The housing members 34 and 35 are of exactly the same construction and each of them is molded to provide not only the slot 33 but a plurality of slots 36 which are formed in the side of the housing member and into projections 37 at the base of the housing members. These slots 36 are formed to conform to the straight vertical sides of the pole pieces 11 and 12 and to the curved lower portions of the pole pieces whereby the pole pieces 11 and 12 may be nested in the slots 36 to accurately space the pole pieces of one pole piece pair 10 from the pole pieces of the next adjoining pole piece pair and thereby insure the exact alignment of the gaps 21 of the several heads.

In the preferred embodiment of the invention a plurality of pole piece pairs 10 with their coils 13 and pole pieces 11 and 12 are assembled with the terminal board 31 and the housing members 34 and 35 by first attaching the lead wires 27 and 28 of the respective coils 13 to their associated terminals 29 and 30 and then inserting the core pieces 16 and 17 into the apertures 15 of the bobbins 14. The core pieces 16 and 17 of the pole pieces 11 and 12, as shown most clearly in FIG. 4 are in intimate contact one with the other when they are inserted in the bobbins 14 whereas the pole shoes 18 and 19 are spaced apart by the shim 20 to provide the flux gap 21. The pole pieces 11 and 12 are then assembled in their slots 36 in the housing members 34 and 35 and at the same time the terminal board 31 is set into the grooves 32 and 33 of the members 34 and 35. This will provide a structure such as that illustrated in FIG. 4.

After the various parts of the multi-track head structure designated 41 have thus been assembled, any suitable potting compound such for example as an epoxy resin may be poured into the interior of the box-like unitary structure thus formed to fill all of the interstices within the structure and to cement the parts together. When the potting compound has set, the lower end of the assemblage may be removed by milling or grinding to remove the portion 40 as shown in dotted lines in FIG. 4 and thereby expose the rounded surface of the pole shoes 18 and 19. This milling or grinding operation is performed while all of the heads 9 are fixed one to another in the box-like structure 41.

After the pole shoes 18 and 19 af all of the heads 9 have thus been aligned with on another, spaced the proper distance from one another and finished to expose the pole shoes 18 and 19, the unitary box-like structure may be suitably affixed to the extending free ends of a plurality of furcations 42 formed in a comb-like sheet of spring material 43. The furcations are formed in the sheet 43 of spring material in any suitable manner and the free ends of the furcations are provided with clearance holes 44 which are somewhat larger than the width of the pole shoes 18 and 19 and preferably longer than the exposed portions of the pole shoes so that the slotting of the spring member and perforating of it to form the furcations 42 and apertures 44 need not be controlled with a high degree of accuracy.

Figure 1:
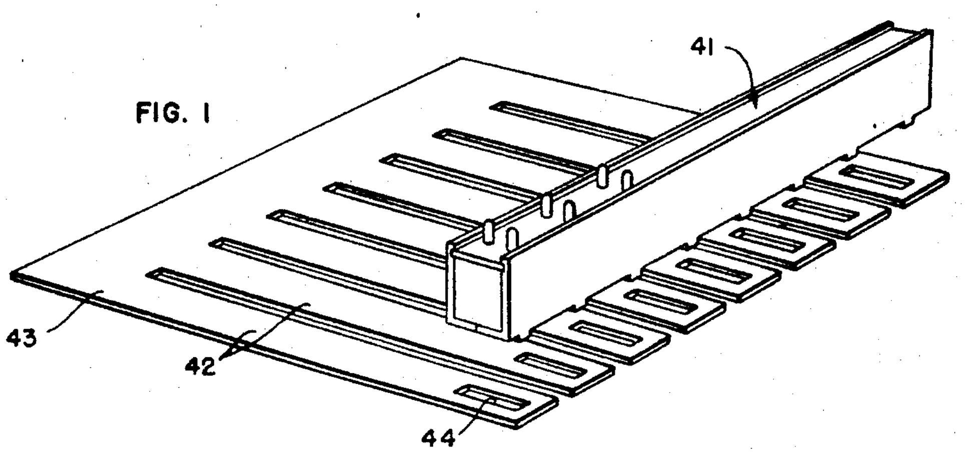
FIG. 1 is an exploded perspective view showing the unitary multi-track head structure in spaced relation to the furcated spring member prior to its being attached to the spring member.
Figure 2:
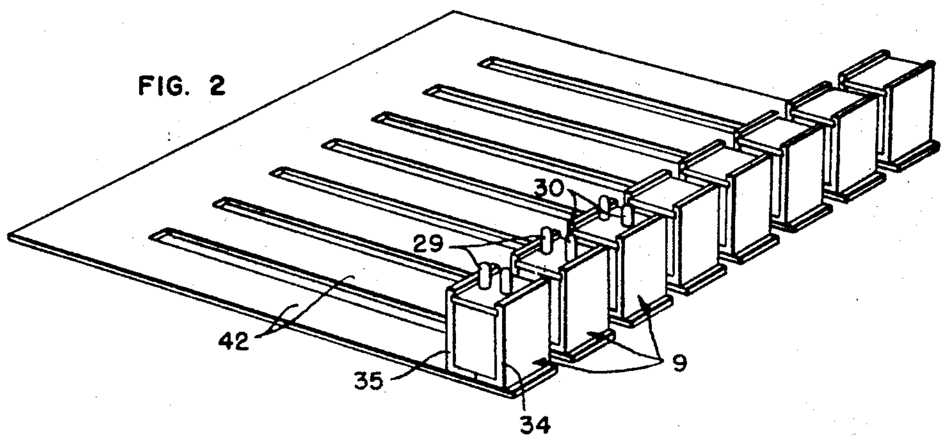
FIG. 2 is a similar perspective view showing the heads after they have been mounted on the spring and separated one from another.
Figure 3:
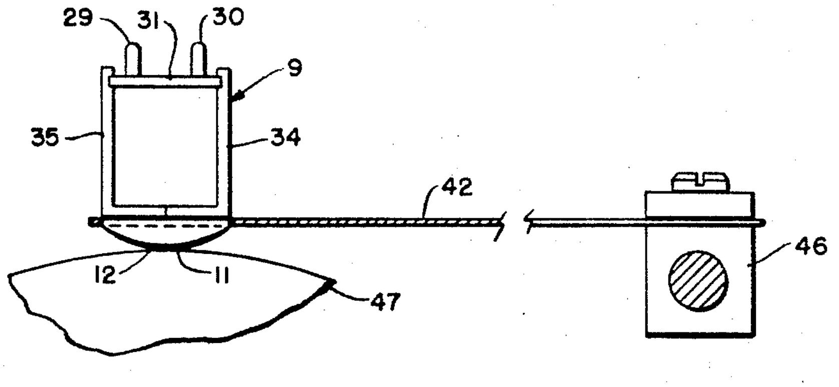
FIG. 3 is a fragmentary view in side elevation of a head mounted for cooperation with a magnetic storage member.

After the individual tooth-like extensions or furcations 42 or the member 43 have each been suitably fixed to the box-like structure 41, the heads 9 may be separated one from the other by cutting through the structure 41 in alignment with the slots between the furcations 42. In this manner the exact alignment of the flux gaps 21 and the exact spacing of the pole pairs 10 will be maintained although the heads may be moved individually relative one to another. The entire assemblage as illustrated in FIG. 2 may then be mounted upon a suitable support 46 to resiliently urge the heads 9 individually toward a recording drum 47. Each head 9 will be able to move up and down as viewed in FIG. 3 while riding over any irregularities that may be present in the magnetic tracks or traces on the drum 47 but will be held in exact alignment with those tracks or traces and each head will either read or write information off of or on to the drum 47 at exactly the same time as any other head 9 in the multi-track assembly.

Although a particular embodiment of the invention is shown in the drawings and described in the foregoing specification it will be understood that the invention is not limited to that specific embodiment, but is capable of modification and rearrangement, and substitution of parts and elements without departing from the scope of the invention .

What is claimed is:

1. The method of making a multi-track read/write head for use with a multi-trace magnetic recording member wherein each head includes a pole piece pair comprising:

assembling the individual pole piece pairs into a unitary multi-track head structure with the pole piece pairs in alignment and spaced predetermined distances apart;

bonding said structure to a comb-shaped spring member with each pole piece pair extending through an opening in a different tooth of said spring member; and cutting through said structure in the spaces between the pole piece pairs to provide a plurality of individually spring supported heads while retaining the linearity and spacing of the pole pieces the same as they were in the unitary structure.

2. The method of making a multi-track read/write head for use with a multi-trace magnetic recording member wherein each head includes a pole piece pair comprising:

assembling all of the individual pole piece pairs into a unitary multi-track head structure with the pole piece pairs fixed to a common support member in alignment and spaced predetermined distances apart;

bonding said structure to a furcated spring member with each pole piece pair extending through an opening in a different furcation of said spring member; and cutting through said structure and support member in the spaces between the pole piece pairs to provide a plurality of individually spring supported heads while retaining the linearity and spacing of the pole pieces the same as they were in the unitary structure.

3. The method of making a multi-track read/write head for association with a multi-trace magnetic recording member wherein the traces on the recording member are spaced predetermined exact distances one from the other comprising:

forming a unitary structure including a plurality of head assemblages having pole pieces which are on centers spaced exactly the same as the spacing of the traces on the recording member;

fixing the individual head assemblages to separate leaf springs which extend from and are integral with a common web and which have pole piece receiving apertures adjacent their free ends that are appreciably larger than the pole pieces of the head assemblages; and cutting through the unitary structure in the area intermediate the leaf springs to provide a plurality of separately-resiliently supported heads in the same spaced relation as the traces on the recording member but movable with respect to each other for engagement with the recording member.

4. The method of making a multi-track read/write head for association with a multi-trace magnetic recording member wherein the traces on the recording member are spaced predetermined exact distances one from the other comprising:

forming a unitary structure including a plurality of head assemblages having pole piece pairs which are on centers spaced exactly the same as the spacing of the traces on the recording member, said pole pieces of each pair being spaced to provide gaps that are exactly aligned with the gaps of other pairs;

fixing the individual head assemblages to separate leaf springs which extend from and are integral with a common web and which have pole piece receiving apertures adjacent their free ends that are appreciably larger than the pole piece pairs of the head assemblages; and cutting through the unitary structure in the area intermediate the leaf springs to provide a plurality of separately-resiliently supported heads in the same spaced relation as the traces on the recording member and with the gaps in each pair aligned with the gaps in the other pairs whereby the head assemblages are movable with respect to each other for engagement with the recording member.

5. The method of making a multi-track read/write head for operative association with a multi-trace magnetic recording member comprising:

securing to a common support member a plurality of head assemblages each comprising a head housing, a magnetic coil and a core having confronting closely spaced portions defining a gap and extending from the housing with the gaps in accurately spaced exact alignment;

fixing the head assemblages individually to individual leaf springs extending from a web of spring material with the pole pieces extending through apertures adjacent the free ends of the leaf springs; and cutting through the common support member to sever the head assemblages one from the other whereby the spacing of the head assemblages will be maintained the same as they were when the head assemblages were mounted in the support member and each head assemblage will be individually resiliently mounted.

6. The method of making a multi-track read/write head for operative association with a multi-trace magnetic recording member comprising:

securing to a common support member a plurality of head assemblages each comprising a head housing, a magnetic coil and a core having confronting closely spaced portions defining a gap and extending from the housing with the gaps in accurately spaced exact alignment;

fixing the head assemblages, while so spaced, aligned and secured to the common support member, individually to individual furcations of a furcated member of spring material with the pole pieces extending through apertures adjacent the free ends of the furcations; and cutting through the common support member to sever the head assemblages one from the other whereby the spacing of the head assemblages will be maintained the same as they were when the head assemblages were mounted in the support member and each head assemblage will be individually resiliently mounted.

7. The method of making a multi-track read/write head for operative association with a multi-trace magnetic recording member wherein the traces are spaced an exact predetermined distance from each other comprising fixing a plurality of read/write heads to a common support member in exact alignment and spaced from each other the same predetermined distance as the traces are spaced, with the operative portions of the heads which are to be operatively associated with the traces extending from the common support member;

permanently attaching the heads to a unitary member of spring material with said operative portions extending through apertures of a size substantially larger than said operative portions of the heads and formed in said unitary member at locations spaced apart a distance substantially equal to the spacing of said traces; and cutting said common support member to completely disconnect said heads from each other in the area of the support member to form a plurality of individually spring supported heads in exact spaced alignment with the traces.

8. The method of making a multi-track read/write head for operative association with a multi-trace magnetic recording member wherein the traces are spaced an exact predetermined distance from each other comprising fixing a plurality of read/write heads to a common support member in exact alignment and spaced from each other the same predetermined distance as the traces are spaced with the opperative portions of the heads which are to be operatively associated with the traces extending from the common support member;

permanently attaching the heads to projecting portions of a unitary member of spring material with said operative portions extending through apertures of a size substantially larger than said operative portions of the heads and formed in said projecting portions of said unitary member at locations spaced apart a distance substantially equal to the spacing of said traces; and cutting said common support member to completely disconnect said head from each other to form a plurality of individually spring supported heads in exact spacing and alignment with the traces.

9. The method of making a multi-track read/write head for operative association with a multi-trace magnetic recording member comprising:

securing to a common support member a plurality of head assemblages each comprising a magnetic coil on a core which has confronting closely spaced portions defining a gap and said cores extending from the body of the support member with the gaps in accurately spaced exact alignment;

slotting a sheet of spring material to provide a plurality of individual leaf springs extending from a common web and having a high degree of flexibility in the direction of their thickness and a high degree of rigidity in the direction of their width;

forming a clearance hole adjacent the free end of each individual leaf spring of a size substantially larger than the portion of the core extending from the common support member;

fixing the head assemblages individually to individual leaf springs with the closely spaced portions of the core extending through the clearance holes in the leaf springs; and severing the support member in the areas between the leaf springs to permit each head assemblage to move in the direction of the thickness of the leaf springs while retaining them in the alignment they were in when they were fixed to the common support member.

10. The method of making a multi-track read/write head for operative association with the multi-trace magnetic recording member comprising:

securing to a common support member a plurality of head assemblages each comprising a magnetic coil on a core which has confronting closely spaced portions defining a gap and said cores extending from the body of the support member;

machining the ends of the cores which define the gaps to align them one with the other;

slotting a sheet of spring material to provide a plurality of individual leaf springs extending from a common web and having a high degree of flexibility in the direction of their thickness and a high degree of rigidity in the direction of their width;

forming a clearance hole adjacent the free end of each individual leaf spring of a size substantially larger than the portion of the core extending from the common support member;

fixing the head assemblages individually to individual leaf springs with the closely spaced portions of the core extending through the clearance holes in the leaf springs; and severing the support member in the areas between the leaf springs to permit each head assemblage to move in the direction of the thickness of the leaf springs while retaining them in the alignment they were in when they were fixed to the common support member.

References Cited

UNITED STATES PATENTS

| | | | |
|---|---|---|---|
| 2,650,957 | 9/1953 | Cohen | 29—155.55 |
| 2,706,752 | 4/1955 | Dupy | 179—100.2 |
| 2,915,812 | 12/1959 | Rettinger | 29—603 |
| 3,000,078 | 9/1961 | Emenaker et al. | 29—603 |
| 3,177,495 | 4/1965 | Felts | 346—74 |
| 3,271,843 | 9/1966 | Vice | 29—603 |
| 2,585,913 | 2/1952 | Camras. | |
| 2,838,834 | 6/1958 | Ganine. | |

JOHN F. CAMPBELL, Primary Examiner

C. E. HALL, Assistant Examiner

U.S. Cl. X.R.

29—423; 179—100; 340—174; 346—74